United States Patent
Wyatt et al.

(10) Patent No.: US 10,019,787 B2
(45) Date of Patent: Jul. 10, 2018

(54) REGIONAL DIMMING FOR POWER SAVINGS

(71) Applicant: NVIDIA Corporation, Santa Clara, CA (US)

(72) Inventors: David Wyatt, San Jose, CA (US); Arman Toorians, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 13/857,079

(22) Filed: Apr. 4, 2013

(65) Prior Publication Data
US 2014/0300618 A1   Oct. 9, 2014

(51) Int. Cl.
*G06T 5/40* (2006.01)
*G09G 3/34* (2006.01)
*G06T 5/00* (2006.01)

(52) U.S. Cl.
CPC ............ *G06T 5/40* (2013.01); *G06T 5/009* (2013.01); *G09G 3/342* (2013.01); *G09G 3/3406* (2013.01); *G06T 2207/10024* (2013.01); *G09G 2320/0646* (2013.01); *G09G 2360/16* (2013.01)

(58) Field of Classification Search
CPC .. G09G 3/3406; G09G 3/342; G09G 2360/16; G09G 2320/0271; G09G 2320/0646; G09G 2320/0233; G09G 2320/0242; G09G 2330/021; G09G 1/002; G06T 5/40; G06F 3/34–3/342
See application file for complete search history.

(56) References Cited

U.S. PATENT DOCUMENTS

| 4,615,013 | A | 9/1986 | Yan et al. | |
|---|---|---|---|---|
| 4,649,267 | A | 3/1987 | Ray | |
| 7,965,327 | B2 | 6/2011 | Gough | |
| 8,035,664 | B2 * | 10/2011 | Kerofsky et al. | 345/690 |
| 8,218,868 | B2 * | 7/2012 | Stern et al. | 382/168 |
| 8,384,653 | B2 | 2/2013 | Kim et al. | |
| 8,451,300 | B2 * | 5/2013 | Hsu et al. | 345/690 |
| 8,547,407 | B2 * | 10/2013 | Chiou et al. | 345/690 |
| 8,665,298 | B2 * | 3/2014 | Hong et al. | 345/690 |
| 8,860,744 | B2 * | 10/2014 | Kerofsky et al. | 345/589 |

(Continued)

FOREIGN PATENT DOCUMENTS

CN   101794542 A   8/2010

OTHER PUBLICATIONS

Ciarlette, Jeff, Introduction to LED Power Sources, http://www.molex.com/mx_upload/family/lightemitting_diode/LED_Power_pdf., Molex Inc. 2-1996.

(Continued)

*Primary Examiner* — Xuemei Zheng

(57) ABSTRACT

A solution is proposed that allows power savings via enhancement of pixel data to compensate for reducing backlight intensity levels. According to one embodiment, each pixel of a display is sorted according to the brightness (intensity) of the pixel. Regional pixel gains are calculated and applied on a per pixel basis so as not to exceed a quality threshold. The intensity of the backlight corresponding to each region may be decreased by an equivalent amount, thereby reducing (potentially significantly) the power consumed to operate the backlight while maintaining the color intensity in the image due to the applied pixel gains.

25 Claims, 13 Drawing Sheets

(56) References Cited

U.S. PATENT DOCUMENTS

| | | |
|---|---|---|
| 2003/0020974 A1 | 1/2003 | Matsushima |
| 2004/0113906 A1* | 6/2004 | Lew et al. ............ 345/211 |
| 2007/0052661 A1* | 3/2007 | Shikata ............... 345/102 |
| 2007/0188849 A1 | 8/2007 | May |
| 2008/0018797 A1* | 1/2008 | Hsieh ............... H04N 9/68 |
| | | 348/645 |
| 2009/0109165 A1* | 4/2009 | Park et al. ............ 345/102 |
| 2009/0167672 A1 | 7/2009 | Kerofsky |
| 2009/0207182 A1 | 8/2009 | Takada et al. |
| 2009/0274389 A1 | 11/2009 | Yamamoto |
| 2009/0322800 A1* | 12/2009 | Atkins ............... 345/690 |
| 2010/0045694 A1 | 2/2010 | Tanaka et al. |
| 2010/0066752 A1 | 3/2010 | Watanuki |
| 2010/0134719 A1 | 6/2010 | Johns et al. |
| 2011/0084981 A1 | 4/2011 | Abe et al. |
| 2011/0141154 A1 | 6/2011 | Ahn et al. |
| 2011/0141166 A1 | 6/2011 | Ahn et al. |
| 2011/0157237 A1* | 6/2011 | Chen et al. ............ 345/690 |
| 2011/0285763 A1 | 11/2011 | Bassi et al. |
| 2011/0305388 A1 | 12/2011 | Wedi et al. |
| 2012/0007896 A1 | 1/2012 | Kwon et al. |
| 2012/0105509 A1 | 5/2012 | Ito et al. |
| 2012/0133673 A1 | 5/2012 | Ninan |
| 2012/0299977 A1 | 11/2012 | Chen et al. |
| 2012/0327303 A1* | 12/2012 | Sun ............... G09G 3/3406 |
| | | 348/687 |
| 2013/0016141 A1 | 1/2013 | Chang et al. |
| 2013/0069551 A1 | 3/2013 | Kitamura et al. |
| 2013/0257886 A1* | 10/2013 | Kerofsky et al. ....... 345/589 |

OTHER PUBLICATIONS

Machine Translation and English abstract for CN 101794542 A.

* cited by examiner

Exemplary Computer System 1300

REGIONAL DIMMING FOR POWER SAVINGS

RELATED APPLICATIONS

This application is related to co-pending applications Ser. No. 13/857,061, entitled "Per Pixel Mapping for Image Enhancement," and Ser. No. 13/857,090, entitled "Regional Histogramming for Global Approximation," each to David Wyatt et al., and filed on the same day herewith.

BACKGROUND OF THE INVENTION

The modernization of televisions, monitors, and other display devices has shifted towards flat panel displays, with prevailing design methodology emphasizing slimmer profiles. As a consequence of the shift in design methodology, the volume traditionally used for certain functions are no longer available in flat panel displays, which include liquid crystal displays (LCDs), plasma displays, and light emitting diode (LED) displays. A backlight is a form of illumination used in LCDs to increase visibility in low light conditions, and to increase the brightness of the displayed image. Typically, backlights are placed at the edge of the LCD display and direct illumination across the screen.

Modern LCD screens are typically manufactured to consist of several layers. A backlight is typically positioned near the rear of the LCD screen and used to illuminate pixels of the display. Additionally, a mechanism is generally included that regulates the light intensity of the pixels by varying (via partial or entirely blocking) the amount of light from the backlight that reaches the target pixel.

More advanced LCD displays often include one or more light guides—a specially-designed layer of material (such as plastic) that diffuses the light through a series of unevenly-spaced bumps to provide even lighting throughout the display. However, lower cost LCD displays may not include light guides, and therefore suffer from degradation of image quality as the intensity of the light from the backlights diffuse across the screen, which cause non-uniform brightness. The non-uniform brightness experienced in a display device itself may cause faded and/or low contrast portions which are can negatively impact a user's viewing experience.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An aspect of the present invention proposes a solution to allow low-cost flat panel displays without light guides to maintain a high quality image display via enhancement of pixel data to account for non uniform brightness. According to one embodiment, each pixel of a display is mapped to the brightness (intensity) of illumination that reaches the pixel. Regional pixel gains are calculated and applied on a per pixel basis to compensate for the non-uniform brightness across the screen. According to such an embodiment, even low cost flat panel displays experiencing non-uniform brightness can be used to render high quality images.

In one embodiment, mapping of the brightness of the illumination that reaches the pixel includes calculating the contribution of the light sources which provide illumination to the pixel. The light sources may include, for example, a backlight that provides illumination to a region of the screen in which the pixel is positioned, as well as illumination from neighboring backlights which reach the pixel. In further embodiments, any calculation of the illumination from the neighboring backlights and/or the regional backlight accounts for the attenuation of the intensities of the illumination from the respective backlights which corresponds to the position of the pixel and distance away from each respective backlight.

In still further embodiments, calculation of the total illumination reaching a pixel may also include contributions from edge-reflected illumination, modeled as a virtual illumination source. According to varying embodiments, accounting for the attenuation of illumination intensities may be estimated by using various linear expressions. In alternate embodiments, the attenuation may be directly measured, and subsequently referenced (e.g., in a table) as needed.

According to another aspect of the present invention, a solution is proposed that allows power savings via enhancement of pixel data to compensate for reducing backlight intensity levels. According to one embodiment, each pixel of a display is sorted according to the brightness (intensity) of the pixel. Regional pixel gains are calculated and applied on a per pixel basis so as not to exceed a quality threshold. The intensity of the backlight corresponding to each region may be decreased by an equivalent amount, thereby reducing (potentially significantly) the power consumed to operate the backlight while maintaining the color intensity in the image due to the applied pixel gains.

In one embodiment, the pixels are sorted by generating a histogram of the luminance values of each pixel in a region. The number of over-saturated pixels is determined, and compared to a pre-defined threshold. A gain is subsequently calculated and applied to the pixels in the region such that the threshold is not exceeded.

According to yet another aspect of the invention, global histogramming of pre-regionally-enhanced pixel values accounting for inter-regional illumination contributions is performed to verify that over-saturation of an image is prevented. According to an embodiment, pixel values that have been regionally enhanced—that is, with applied gains calculated for the respective regions—are further added to illumination values corresponding to the pixel values, with the resultant summed pixel values being histogrammed again to determine the amount of over-saturated pixels. An over-abundance of over-saturated pixels results in a calculation of a global modifier applied to each pixel to reduce the number of over-saturated pixels below an acceptable threshold.

In a further embodiment, the illumination values corresponding to the pixel values may be referenced from a pre-computed map of illumination values that accounts for not only the contributions to illumination from the primary and neighboring regions corresponding to each pixel, but further accounts for orthogonal and coaxial attenuation of light sources as well.

BRIEF DESCRIPTION OF THE DRAWINGS

The accompanying drawings are incorporated in and form a part of this specification. The drawings illustrate embodiments. Together with the description, the drawings serve to explain the principles of the embodiments.

DETAILED DESCRIPTION

Figure 1:
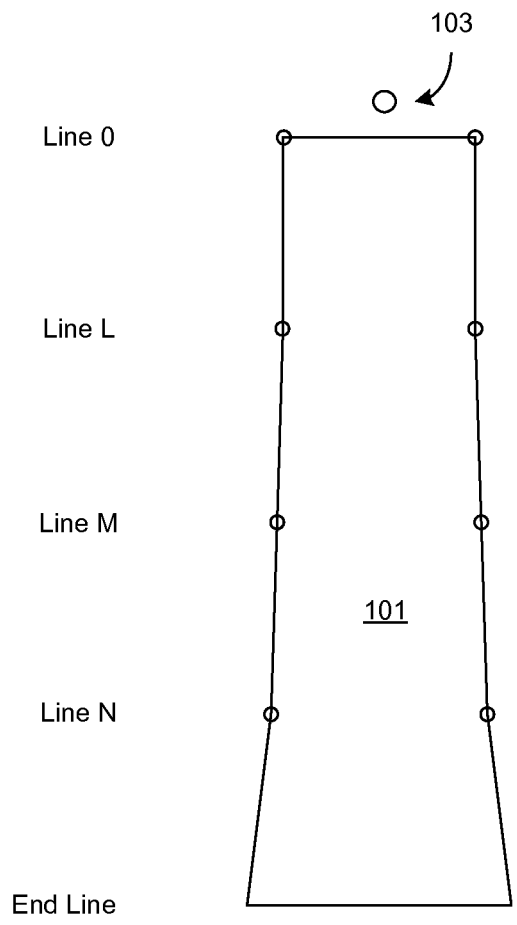
FIG. 1 depicts an exemplary vertical backlight region, in accordance with various embodiments of the present invention.

Reference will now be made in detail to the preferred embodiments of the claimed subject matter, a method and system for the use of a radiographic system, examples of which are illustrated in the accompanying drawings. While the claimed subject matter will be described in conjunction with the preferred embodiments, it will be understood that they are not intended to limit these embodiments. On the contrary, the claimed subject matter is intended to cover alternatives, modifications and equivalents, which may be included within the spirit and scope as defined by the appended claims.

Furthermore, in the following detailed descriptions of embodiments of the claimed subject matter, numerous specific details are set forth in order to provide a thorough understanding of the claimed subject matter. However, it will be recognized by one of ordinary skill in the art that the claimed subject matter may be practiced without these specific details. In other instances, well known methods, procedures, components, and circuits have not been described in detail as not to obscure unnecessarily aspects of the claimed subject matter.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present claimed subject matter, discussions utilizing terms such as "storing," "creating," "protecting," "receiving," "encrypting," "decrypting," "destroying," or the like, refer to the action and processes of a computer system or integrated circuit, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Embodiments of the claimed subject matter are presented to include an image display device, such as a flat panel television or monitor, equipped with one or more backlights. These backlights may be programmed to provide illumination for pixels of the image display device. In certain embodiments, the position of the backlight(s) separates the pixels of the image display device into a plurality of regions, with each region being associated with the backlight closest in position to the region, and providing a primary source of illumination for the pixels in the region. In certain embodiments, illumination provided by neighboring backlights may overlap in one or more portions of one or more regions. In still further embodiments, the intensity of the illumination provided by a backlight decreases (attenuates) the greater the distance from the backlight.

Exemplary Region Configuration with Light Guides

FIG. 1 depicts an exemplary vertical backlight region 100, in accordance with various embodiments of the present invention. As depicted in FIG. 1, the backlight region 100 is illuminated by a single backlight positioned along a horizontal edge. As presented in FIG.* 1, the light guides are represented by the mid and end points (e.g., Line 0, L, M, N, and End line) which correspond to horizontal address lines of an array of pixels of which the display is comprised, and along the vertically oriented edges of the region defining the region 101 illuminated by a backlight 103. In some embodiments, light guides mitigate the effect of light intensity attenuation and maintain a roughly consist illumination throughout the corresponding region 101.

According to an embodiment, to determine if a pixel is within a vertical region, the pixel's coordinates are compared to the X-offset at the start (X1) and end (X2) bounds of a region, for each of the regions programmed. The membership test may use linear midpoint algorithm to compute the X-Offset from intermediate line positions. A membership test for a pixel at an offset (x) on line (y) may be expressed as, for example:

$$X1.y=F1(y), X2.y=F2(y)$$

with membership if x≥X1.y and x<X2.y.

Figure 2:
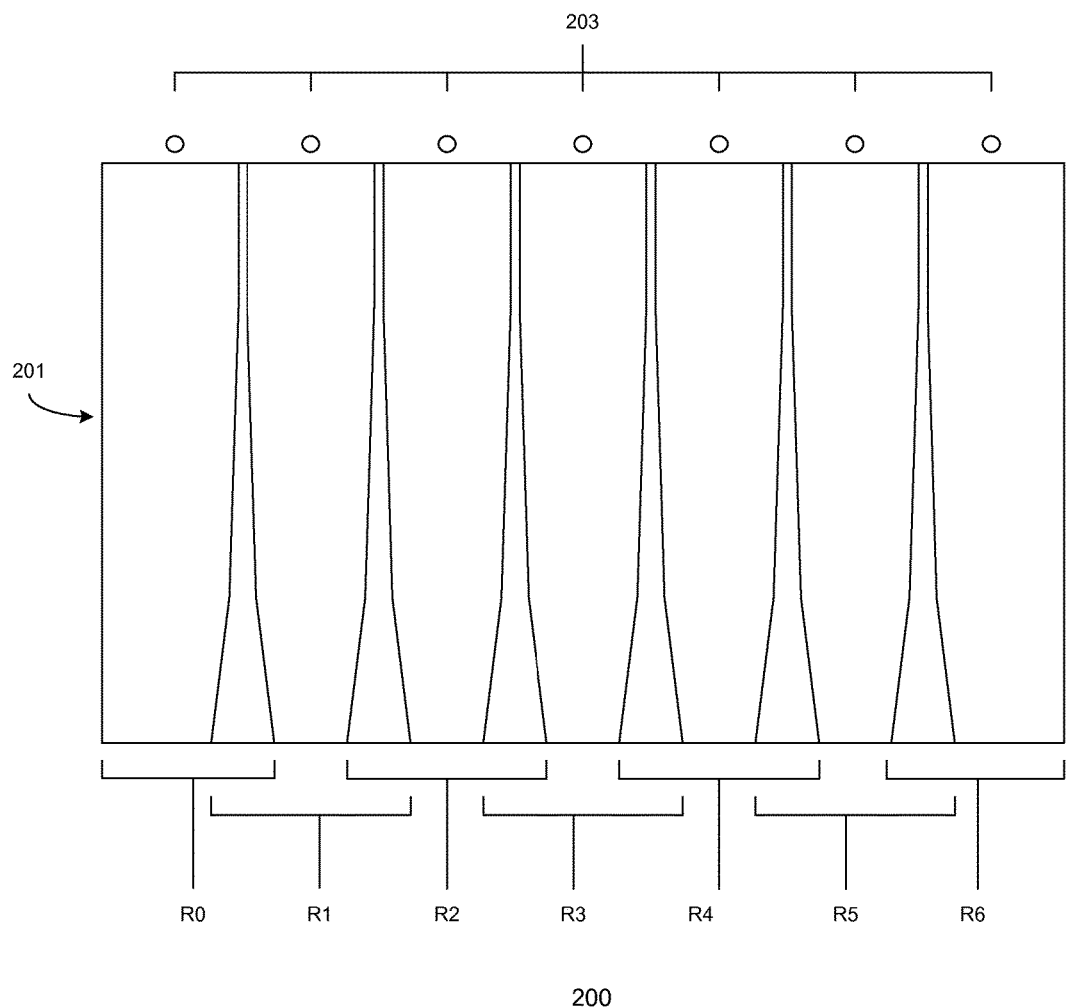
FIG. 2 depicts an exemplary on-screen configuration with overlapping vertical regions, in accordance with various embodiments of the present invention.

FIG. 2 depicts an exemplary on-screen configuration 200 with overlapping vertical regions (R0-R6), in accordance with various embodiments of the present invention. As depicted in FIG. 2, a plurality of backlights 203 illuminate a corresponding plurality of regions of a screen 201. As presented, portions of some regions may overlap slightly. For embodiments with light guides, the illumination reaching pixels anywhere in the screen 201 may be relatively consistent and uniform.

Figure 3:
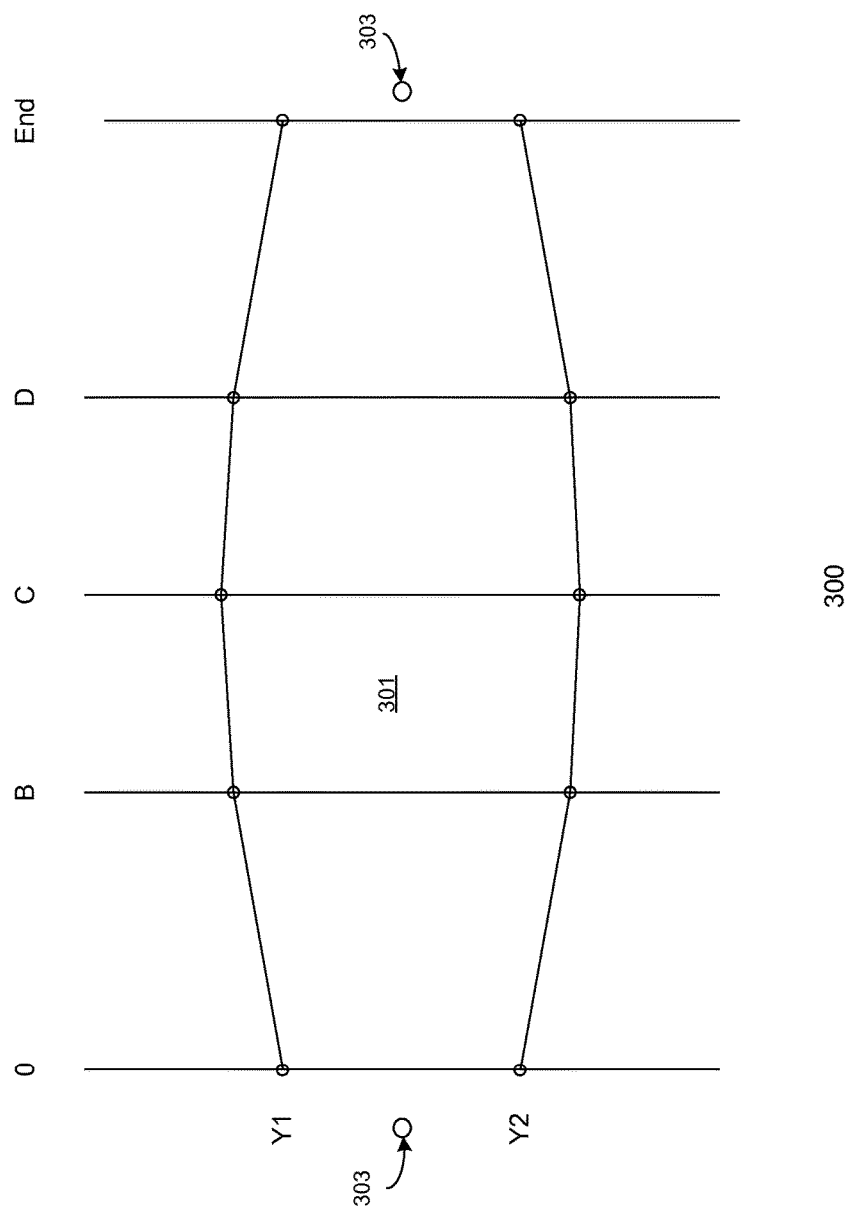
FIG. 3 depicts an exemplary horizontal backlight region, in accordance with various embodiments of the present invention.

FIG. 3 depicts an exemplary horizontal backlight region 300, in accordance with various embodiments of the present invention. As depicted in FIG. 3, the backlight region 300 is defined by a plurality of backlights 303 positioned along both (left and right) vertical edges. As presented in FIG. 3, the light guides are represented by the intersections of the vertical lines (e.g., Line 0, B, C, D, and End) which correspond to vertical address lines of an array of pixels of which the display is comprised; and the vertically oriented edges of the region defining the region 301 illuminated by a backlight 303.

According to an embodiment, to determine if a pixel is within a horizontal region, the pixel's coordinates are compared to line at the start (Y1) and end (Y2) bounds of a region, for each of the regions programmed. The membership test may use linear midpoint algorithm to compute a Y-line from intermediate X-Offset positions. A membership test for a pixel at an offset (x) on line (y) may be expressed as, for example:

$$Y1.x=F1(x), Y2.x=F2(x)$$

with membership if y≥Y1.x and y<Y2.x

Figure 4:
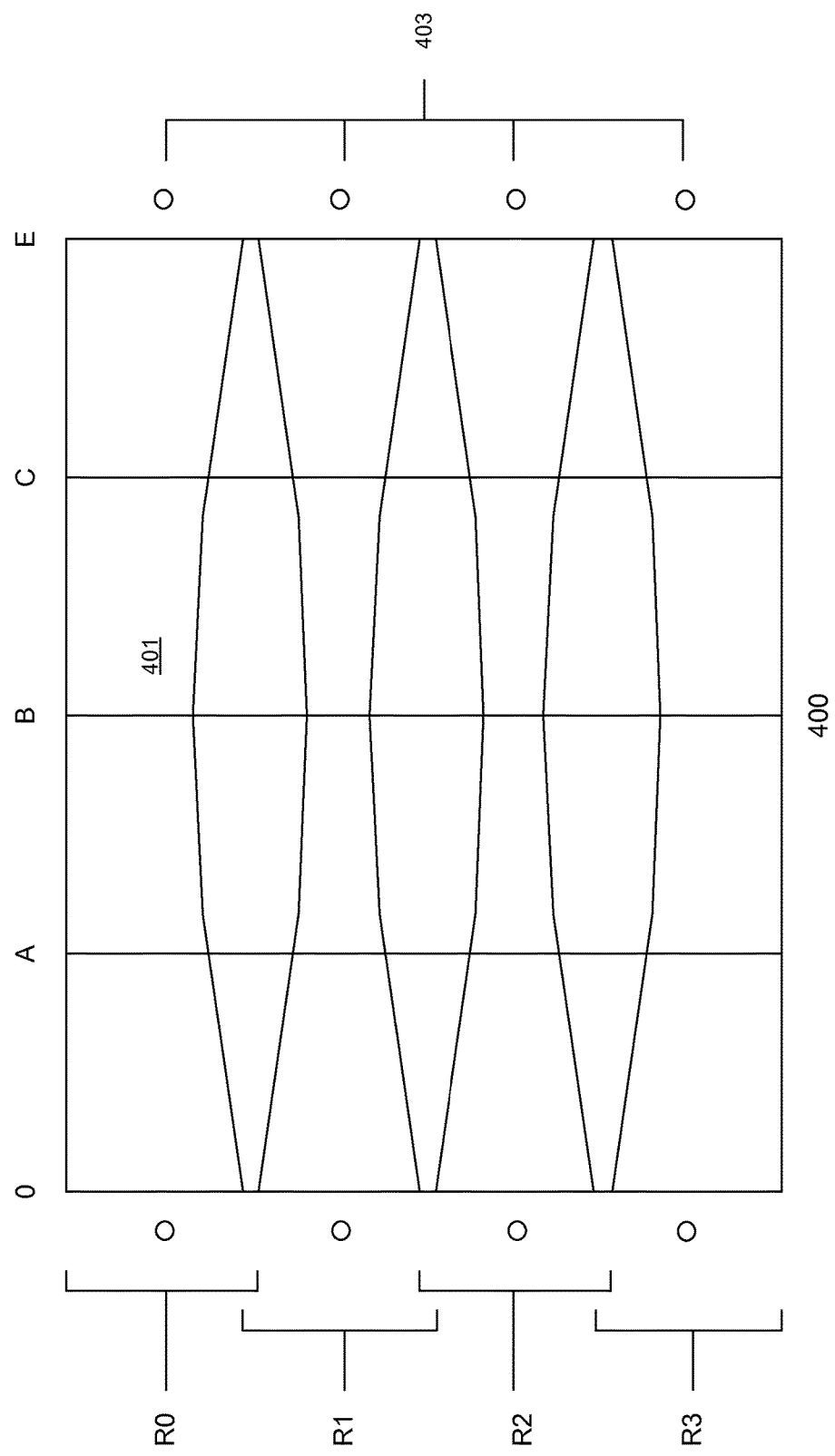
FIG. 4 depicts an exemplary on-screen configuration with overlapping horizontal regions, in accordance with various embodiments of the present invention.

FIG. 4 depicts an exemplary on-screen configuration 400 with overlapping horizontal regions (R0 -R3), in accordance with various embodiments of the present invention. As depicted in FIG. 4, a plurality of backlights 403 illuminate a corresponding plurality of regions of a screen 401. As presented, portions of some regions may overlap slightly. For embodiments with light guides, the illumination reaching pixels anywhere in the screen 401 may be relatively consistent and uniform.

Exemplary Region Configuration without Light Guides

Figure 5:
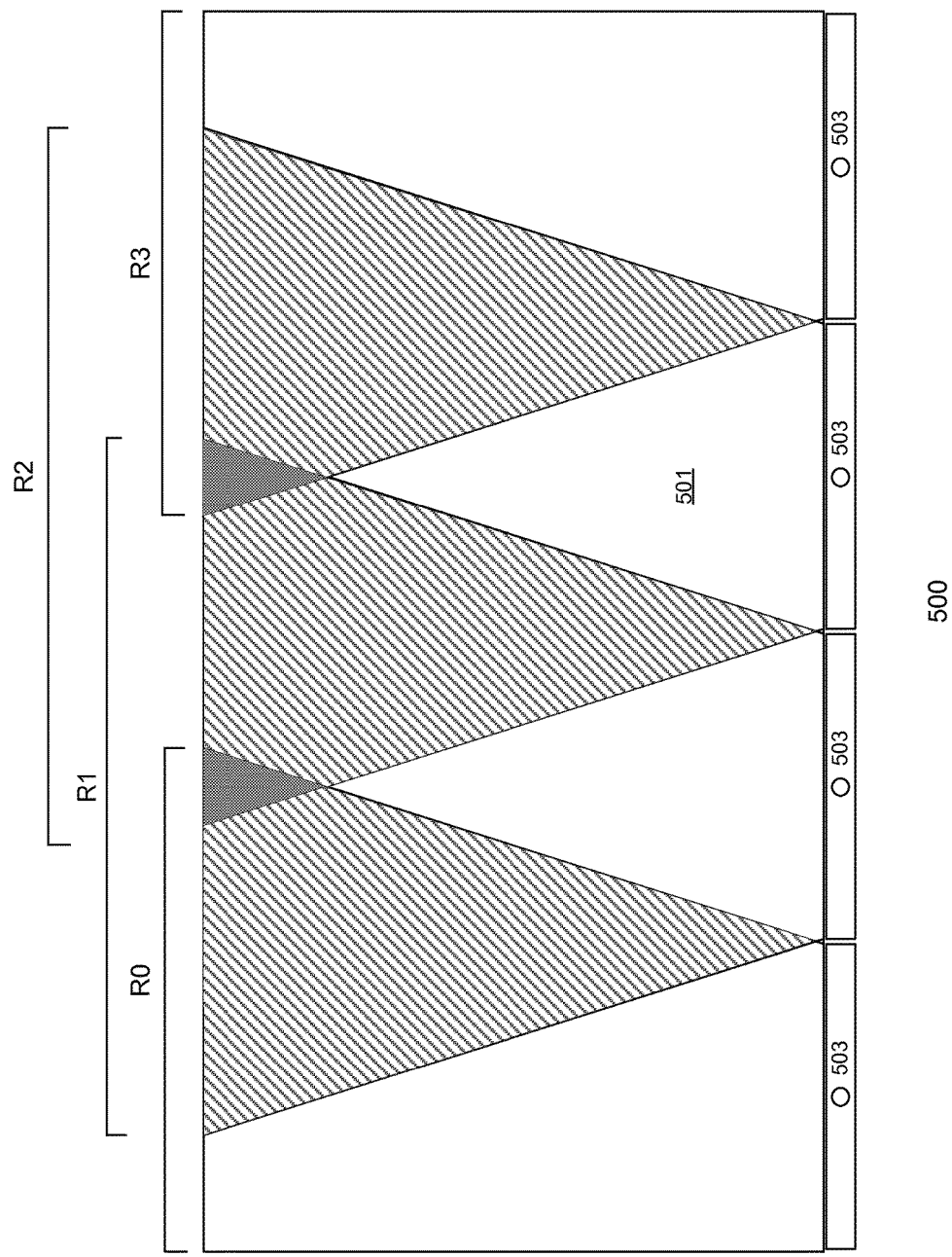
FIG. 5 depicts an exemplary on-screen configuration with overlapping vertical unguided regions, in accordance with various embodiments of the present invention.

In some embodiments, particularly in the case of low cost flat panel displays, light guides may not be included or used. In such instances when no light guides are used, the light fans out from the light source in an unconstrained manner. FIG. 5 depicts an exemplary on-screen configuration 500 with overlapping vertical unguided regions, in accordance with various embodiments of the present invention. As depicted in FIG. 5, the panel 501 is illuminated by a four backlights 503 positioned along the (bottom) horizontal edge of the panel 501 that provide illumination to a corresponding number of regions (R0 -R3) in the display. As presented in FIG. 5, two or more regions may partially overlap. Without the presence of light guides, pixels located farther away from the backlights 503 (e.g., pixels positioned higher in the panel 501) may experience light attenuation, which causes an unsatisfactory drop in the intensity of the displayed pixel and a reduction in perceived contrast.

Figure 6:
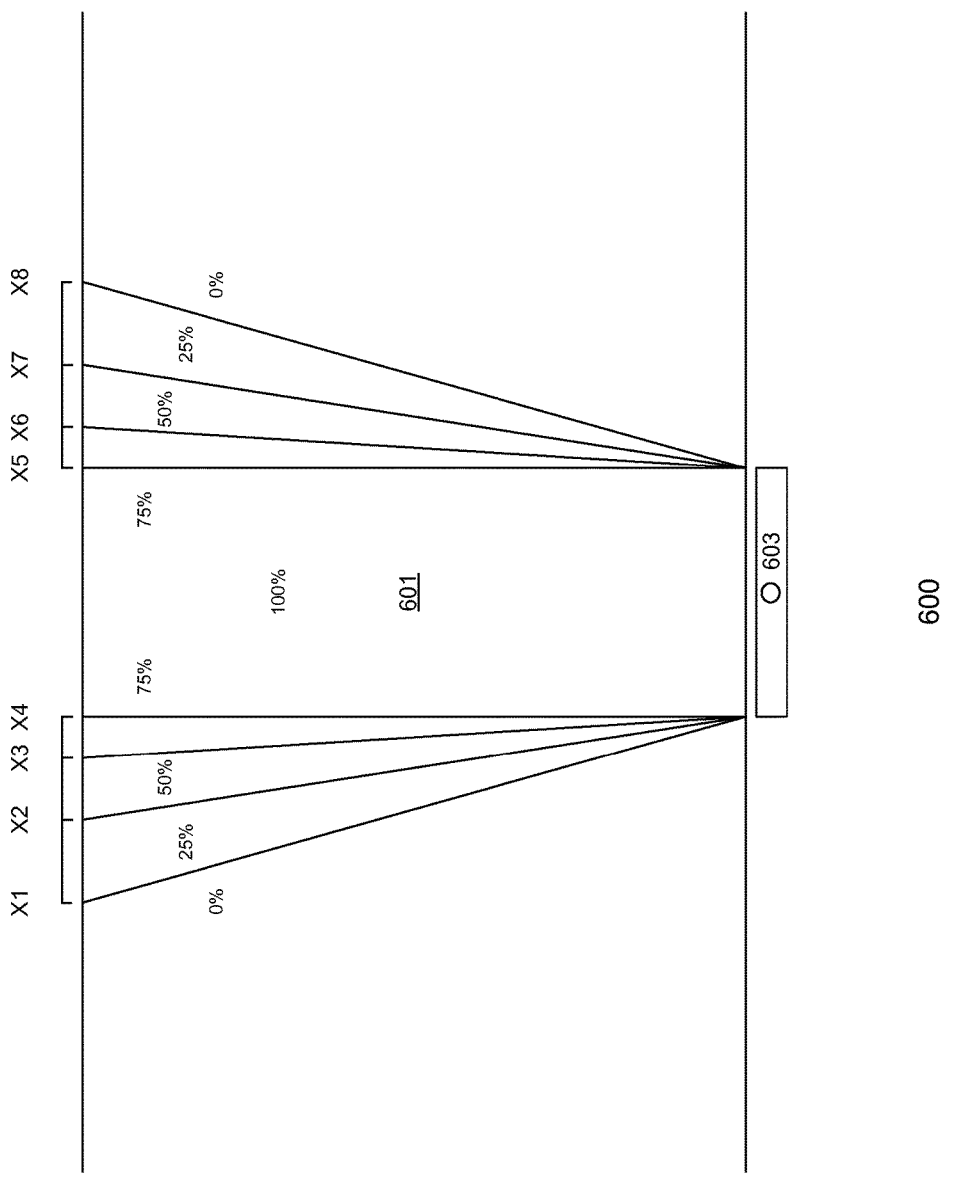
FIG. 6 is an exemplary on-screen depiction of orthogonal attenuation of vertical unguided regions, in accordance with embodiments of the present invention.

FIG. 6 is an exemplary on-screen depiction 600 of orthogonal attenuation of vertical unguided regions in a panel 601, in accordance with embodiments of the present invention. As depicted in FIG. 6, the amount of received light from the backlight 603 in a pixel may be expressed as a percentage, and decreases as a function of the distance from the boundaries of the backlight 603. An estimation of the contribution of the particular backlight 603 may thus be calculated that includes orthogonal attenuation based on the sub-region (e.g., X1-X8) and distance from the boundary of backlight 603.

According to one embodiment, the function to estimate the orthogonal attenuation (Fr) in a backlight (B) at point x, y, may be expressed as:

$$B_{xy}=Fr(x, y, B)$$

Figure 7:
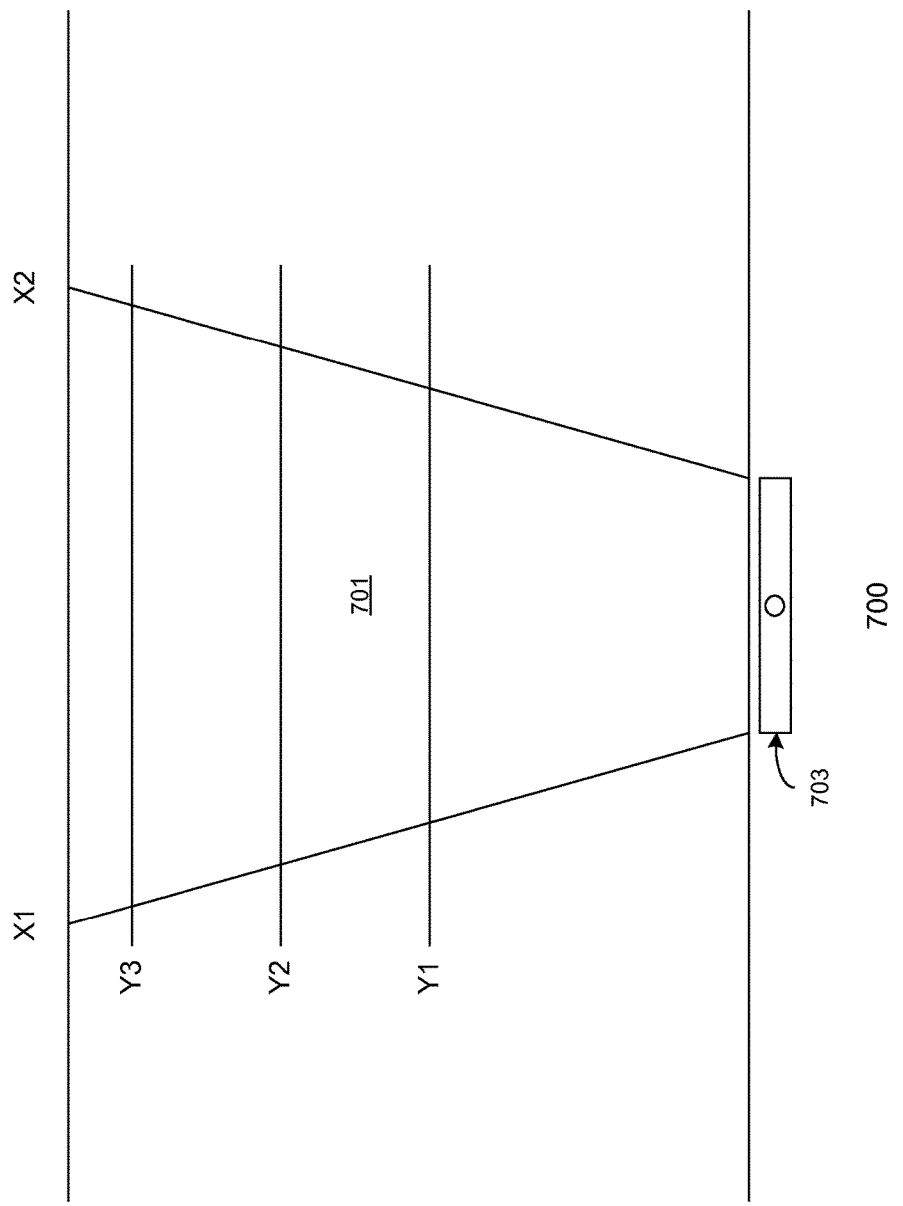
FIG. 7 depicts an exemplary on-screen depiction of coaxial attenuation of vertical unguided regions, in accordance with embodiments of the present invention.

FIG. 7 is an exemplary on-screen depiction 700 of coaxial attenuation of vertical unguided regions, in accordance with embodiments of the present invention. The depiction 700 of the coaxial attenuation a vertical unguided region 701 may be used to accommodate for coaxial attenuation along the axis of the light, and adjusts for inefficiencies in the backlight diffuser which decreases the backlight in transmission along the diffuser. As depicted in FIG. 7, the amount of received light from the backlight 703 in a pixel may be expressed as a percentage, and decreases (past a threshold at Y1) as a function of the distance from the boundaries of the backlight 603. An estimation of the contribution of the particular backlight 703 may thus be calculated that includes coaxial attenuation based on the sub-region (e.g., Y1-Y3) and distance from the backlight 703.

According to one embodiment, the function to estimate the coaxial attenuation (Fc) in a backlight (B) at point x, y, may be expressed as:

$$B_y=Fc(y, B)$$

Exemplary Histogram Regions

To accommodate for attenuated illumination through the display panel, pixel values may be enhanced by applying a gain to the pixel. More specifically, a pixel value may be enhanced by artificially increasing the intensity of the luminance component of the pixel value. However, since each color space has a finite range of values (0-255), increasing the intensity of the luminance component of every pixel value by the same and/or a large value may cause over-saturation (e.g., for those pixel values which approximate the upper end of the range). Excessive over-saturation causes a loss of contrast and data.

One solution to mitigate the amount of over-saturation is to generate a histogram of the distribution of pixel values (e.g., luminance) to determine the median luminance of the pixels in the image. From the histogram, the density of pixel values which approximate the upper end of the range of color values and are therefore in danger of being over-saturated if an excessive gain is applied may be determined. In still further embodiments, a histogram may be performed for each of the plurality of regions in a display panel.

Figure 8:
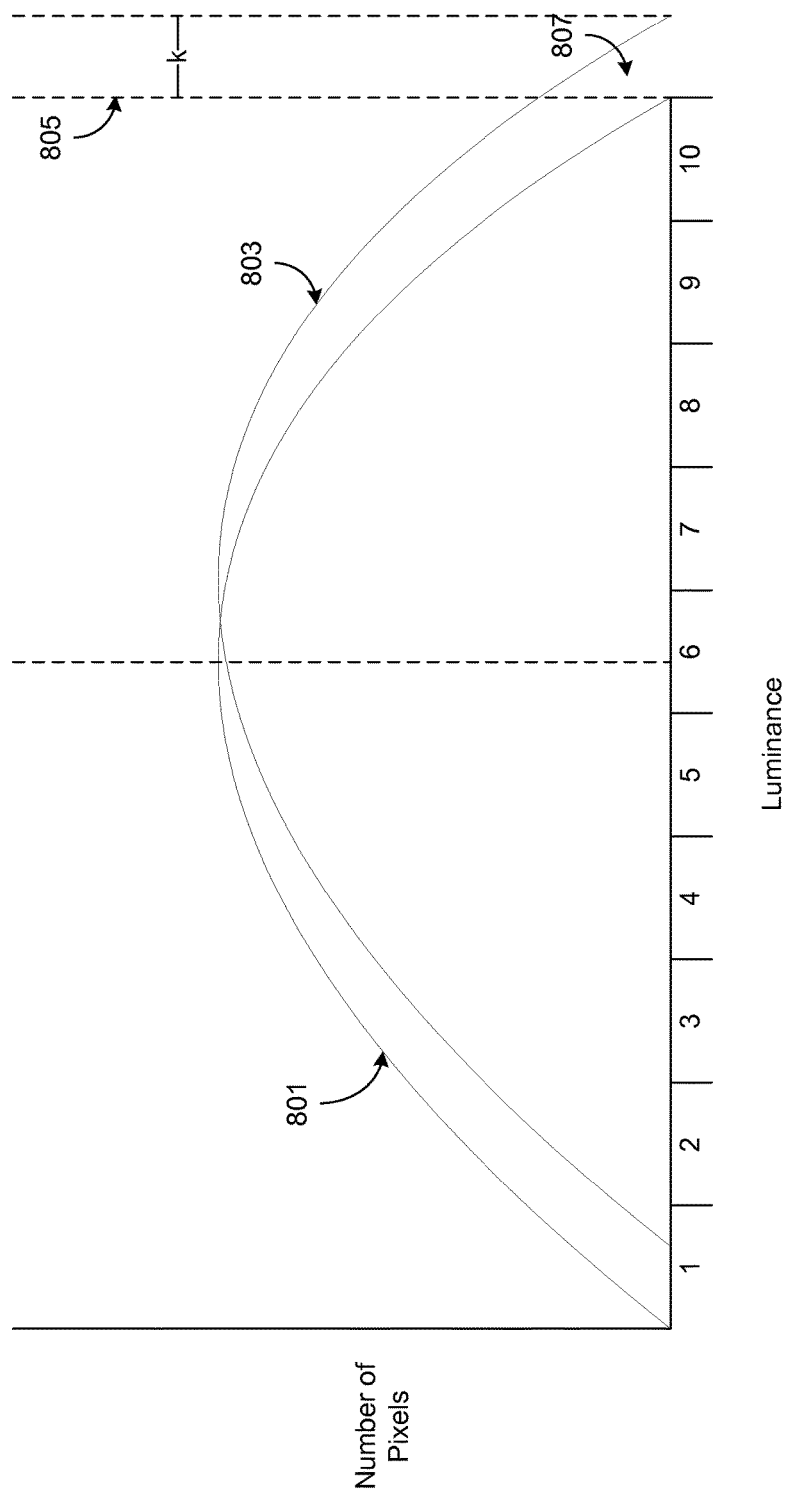
FIG. 8 depicts an exemplary histogram, in accordance with embodiments of the present invention.

FIG. 8 is an exemplary depiction 800 of a histogram 800, in accordance with embodiments of the present invention. As depicted in FIG. 8, the pixel values (in a region, for example) are sorted in a plurality of bins (enumerated 1-10) by the respective luminance. The luminance for each pixel may consist of the pixel's color intensity value, an illumination from one or more backlights experienced by the pixel, or a combination of these factors. In some embodiments, the pixels may be sorted and plotted 801. To determine the number of over-saturated pixels, a quality threshold 805 may be compared to the number of pixels that meet or exceed that threshold according to the histogram 800. For example, as depicted in FIG. 8, the number of pixels in bins beyond the threshold 805 (e.g., bins 9 and 10) may be determined to be 0. If the number of pixels exceeds the quality threshold (e.g., 10%), the number of over-saturated pixels may be deemed to be too high, with appropriate correction needed. When the quality threshold has not been met, image enhancement may be performed. In one embodiment, the color intensity values of the pixels and/or the backlight illumination may be adjusted by applying a modifier k to one or more of these values. The modifier may be applied individually, on a per region basis, or globally, according to various embodiments. Once applied, a second histogram plot 803 may be generated to determine the number of over-saturated pixels resulting from the application of k. These pixels are denoted as the region 807 below the plot 803 and beyond the saturation line 805. If the number of pixels in region 807 do not exceed the quality threshold, the gain may be applied to the pixels and displayed. Otherwise, if the number of pixels in region 807 do exceed the quality threshold, the gain may be modified (reduced) such that the number of pixels in the region 807 does not exceed the quality threshold, prior to display. According to further embodiments, additional histograms may be generated upon each gain modification to verify that the number of pixels in the region 807 does not exceed the quality threshold.

Figure 9:
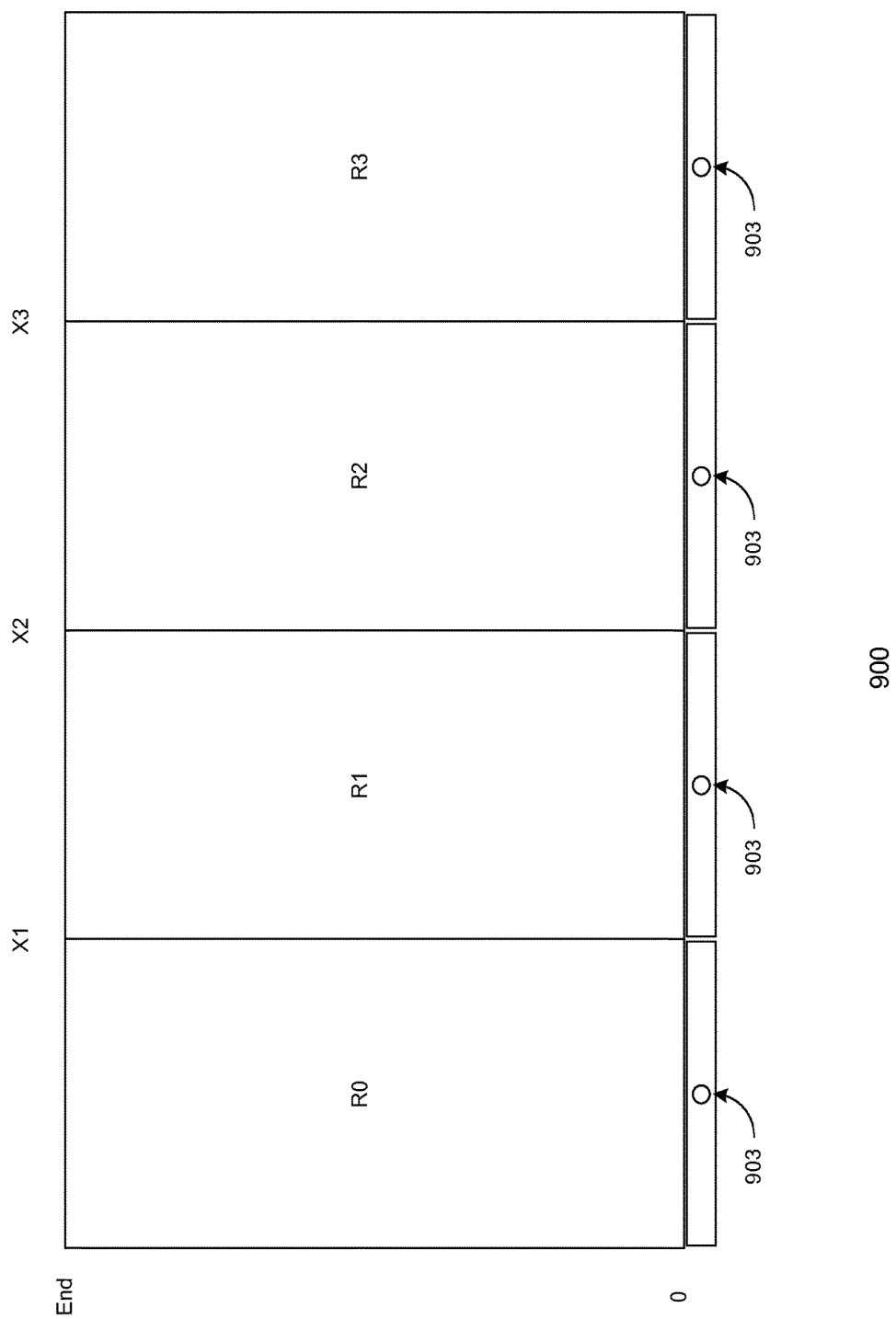
FIG. 9 depicts an exemplary depiction of histogram regions, in accordance with embodiments of the present invention.

FIG. 9 is an exemplary depiction 900 of histogram regions (R0-R3), in accordance with embodiments of the present invention. As depicted in FIG. 9, four backlights (903) are arranged along a bottom horizontal axis of a display panel, with each backlight corresponding uniquely to a histogram region. In some embodiments, overlapping regions may not be considered. A histogram for the pixel values of pixels in each region R0, R1, R2, and R3 is generated. The amount of gain applied to the pixels of a region is calculated based on the distribution of pixels in the histogram, and is discussed in greater detail below.

Regional Pixel Enhancement

Figure 10:
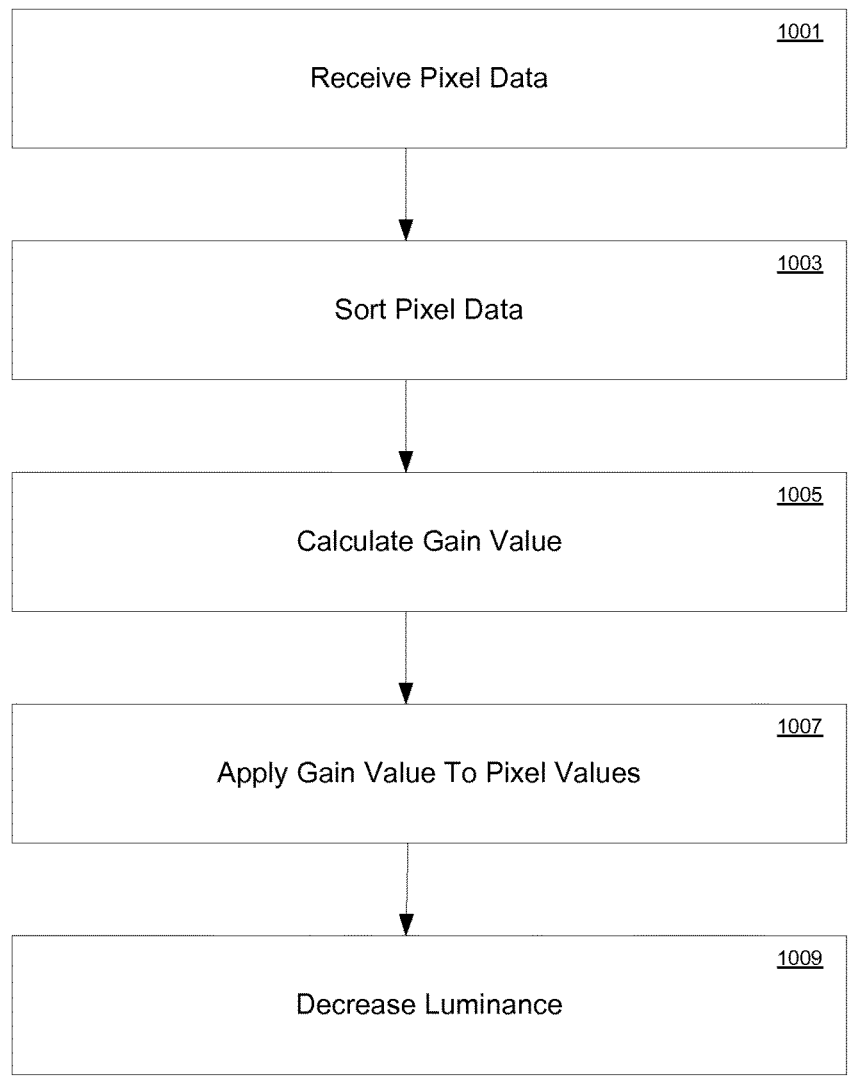
FIG. 10 depicts a flowchart of a process of per pixel mapping for image enhancement, in accordance with embodiments of the present invention.

FIG. 10 is an illustration of a flowchart 1000 for performing per-pixel illumination mapping for image enhancement, in accordance with an embodiment. Steps 1001-1009 describe the steps comprising the process depicted in the flowchart 1000 of FIG. 10.

At step 1001, image data for a first image is received in a display device. The display device may be implemented as, for example, a flat panel television, a flat panel monitor, or any other flat panel display device with one or more backlights. According to an embodiment, the display panel of the display device is arranged as a plurality of discrete pixels uniformly spaced throughout a two dimensional space. In an embodiment, each backlight corresponds to a region of the display device, with each region comprising a subset of the pixels. In further embodiments, each backlight provides a primary illumination to the corresponding region.

The image data may be received from an input source, such as a cable box; over the air transmissions; read from an optical storage medium or computer memory device; or streamed over a network, such as the Internet. Images displayed in a display device may be received as input as a two-dimensional array of pixel values corresponding to the color to be displayed at each pixel in the display device. In an embodiment, the image data received may comprise a two-dimension array of color values in a Red Green Blue (RGB) color space. According to such embodiments, the color values are first converted into a luminance-chrominance (YUV) color space, with each pixel value being represented as a luminance vector.

At step 1003, a position of each pixel in the display panel is determined. Determining the position of a pixel in the display panel may, for example, include determining a primary backlight and a region corresponding to the pixel. At step 1005, light contributions received in each pixel are calculated. Light contributions may include the illumination provided by the primary backlight of the region corresponding to the pixel, as well as the illumination provided by neighboring backlights. In still further embodiments, the light contribution may include illumination from one or more backlights reflected from a boundary edge of the display device. Calculating the light contribution in a pixel from the primary backlight corresponding to the pixel may be performed, by for example, determining a distance between the pixel and the primary backlight, and applying a modifier to the illumination beyond a specified distance.

In alternate embodiments, attenuation of the illumination provided to a pixel by the primary backlight and neighboring backlights may also be calculated. Attenuation of the illumination may comprise either or both of orthogonal attenuation and/or coaxial attenuation, each of which has been described above, and is based on the derived distance from a pixel to a contributing backlight. In an embodiment, edge reflected light for a pixel may be calculated by generating a virtual illumination source (e.g., backlight) as the edge, and applying a coaxial attenuation (as above) to the illumination provided by the source (e.g., reflected by the edge).

According to alternate embodiments, the light contribution from the backlights and/or reflective edge may be derived by referencing a pre-computed table of values. The pre-computed table of values may store the illumination values which corresponding to the light contribution for each of the sources at each pixel. The pre-computed table of values may be derived by taking an image of the illumination, and measuring the illumination at each pixel. In an embodiment, the pre-computed table of values may be implemented as a texture map, and stored in a memory device in the display device.

According to one embodiment, the calculated gain value k may be applied to both the backlight and the image pixel values to balance out and present the user with a single consistent image. The total luminance L then of the pixel and backlight may be expressed as:

$$L=B*I$$

where B is the backlight contribution and I is the color intensity.

Applying a gain (k) to the image allows a reduction (1/k) to the backlight to achieve the same net user visible image luminance, as described below with respect to FIG. 11. Such a relation may be expressed as:

$$L=(1/k*B)*(k*I).$$

For pixels in regions with overlapping contributions from neighboring backlights, the value of the gain (k) may be computed as a function of the backlight (B) contribution of left, right neighboring regions (R) as well as the center region. For the central region, this is computed based on the original or primary backlight setting (B) and the orthogonal (Fr) and coaxial (Fc) attenuation of the backlight at the position of the pixel, and may be expressed as:

$$B_{xy}=Fc(y, Fr(x, y, B)).$$

The combined overlapping regions in turn may be expressed as:

$$B_{xy}=B(R_{n-1})+B(r_n)+B(R_{n+1});$$

$$B_{xy}=Fc(y, Fr(x, y, B_n))+Fc(y, Fr(x, y, B_n))+Fc(y, Fr(x, y, B_{n-1})).$$

A membership test is used to determine the central region and to select the left and right side regions, if applicable. The ratio of the original/primary region's backlight to the total is thus calculated that includes the contribution of neighbors. This ratio indicates the necessary scaling of k to balance for image enhancement, proportional to the increased backlight at the pixel's location. The ratio is simply the primary backlight for the region divided by the final actual backlight:

$$k_{xy} = k*(B_n/B_{xy}).$$

With the per pixel enhancement $k_{xy}$ is being applied to the image pixel.

Once the separate light contributions are derived for each pixel (either via linear approximation or direct measurement), the total illumination received in each pixel from all light sources in the panel is mapped to the pixel at 1005. According to some embodiments, a histogram is generated for each region of the respective total illumination values for each pixel in the region. A pre-determined quality threshold is compared to the data in the histogram. In an embodiment, the quality threshold may be implemented as a percentage of oversaturated pixels. A regional gain value is calculated at step 1007 for each region such that applying the computed gain of a region to the pixel values in the region does not cause the number of pixels in the region to become oversaturated beyond the percentage of the quality threshold. Each gain value may, in some embodiments, be calculated for each region independently from other regions, and disparate gain values may result for each region.

For example, if the quality threshold is set to 10%, a regional gain value is computed such that the addition of the gain value to each of the pixel values in the region does not cause the number of enhanced pixels with a pixel value at the limit of 255 (alternately, the number of pixels in the highest value bin of the histogram) to exceed the threshold, i.e., 10% of the total number of pixels in the region. Once the regional gain value is calculated, the regional gain is applied to the pixel data of the pixels in the region at step 1009.

In still further embodiments, a soft clip may be applied such that the amount of gain added to a pixel decreases as a function of the pixel's original value. Thus, the computed gain for pixels with already high pixel values may be less than the gain applied to pixels with lower starting pixel values. In still further embodiments, regions identified as corresponding to a center of the image may have a higher quality threshold than regions near the edge. As images tend to have greater brightness in the center (in part to accommodate a natural tendency to focus in the middle of an image), a larger portion of over-saturation in the center of an image may be permissible. Accordingly, the quality of an image can be improved to compensate for non-uniform illumination in low-cost flat panel displays by enhancing the brightness of pixels while still maintaining a desired level of image quality.

Regional Dimming for Power Saving

Figure 11:
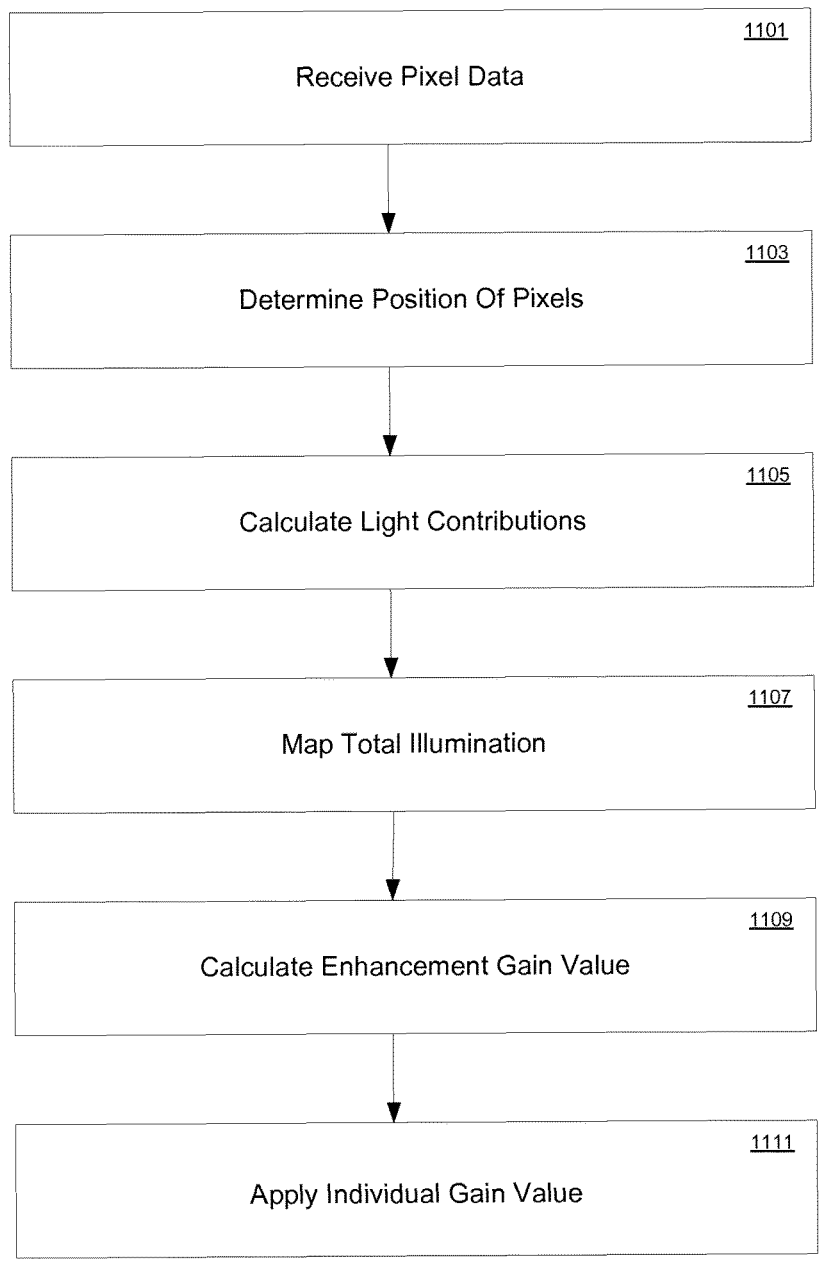
FIG. 11 depicts a flowchart of a process of regional dimming for power saving, in accordance with embodiments of the present invention.

FIG. 11 is a flowchart of a process 1100 of regional dimming for power saving, in accordance with embodiments of the present invention. Steps 1101-1109 describe the steps comprising the process depicted in the flowchart 1100 of FIG. 11.

At step 1101, image data for a first image is received in a display device. The display device may be implemented as, for example, a flat panel television, a flat panel monitor, or any other flat panel display device with one or more backlights. According to an embodiment, the display panel of the display device is arranged as a plurality of discrete pixels uniformly spaced throughout a two dimensional space. In an embodiment, each backlight corresponds to a region of the display device, with each region comprising a subset of the pixels. In further embodiments, each backlight provides a primary illumination to the corresponding region.

As with process 1000 described above, the image data may be received from an input source, such as a cable box; over the air transmissions; read from an optical storage medium or computer memory device; or streamed over a network, such as the Internet. Images displayed in a display device may also be received as input as a two-dimensional array of pixel values corresponding to the color to be displayed at each pixel in the display device. In an embodiment, the image data received may comprise a two-dimension array of color values in a Red Green Blue (RGB) color space. According to such embodiments, the color values are first converted into a luminance-chrominance (YUV) color space, with each pixel value being represented as a luminance vector.

At step 1103, the pixel data for each of the plurality of pixels is sorted based on a luminance of the pixel data corresponding to the plurality of pixels. In an embodiment, the pixels may be sorted by generating a histogram of the luminance of the pixel data. At step 1105, a gain value for each pixel is calculated based on the sorted plurality of pixels. In an embodiment, each pixel corresponds to a region illuminated by a backlight. According to such embodiments, a histogram is generated for each region, and a gain value is calculated for an entire region. In such embodiments, the gain value is calculated such that applying the computed gain value to the pixels (at step 1107) in a region does not cause the number of pixels in the region to become oversaturated beyond a quality threshold. Finally, at step 1109, the illumination produced in each backlight may be reduced by an amount equivalent to the gain applied to the pixels in the region (which may be different between regions). Accordingly, the power consumed by the display device can be drastically reduced (i.e., the power consumed by the backlight) while the intensity of the colors in the image are preserved.

Regional Histogramming for Global Approximation

Figure 12:
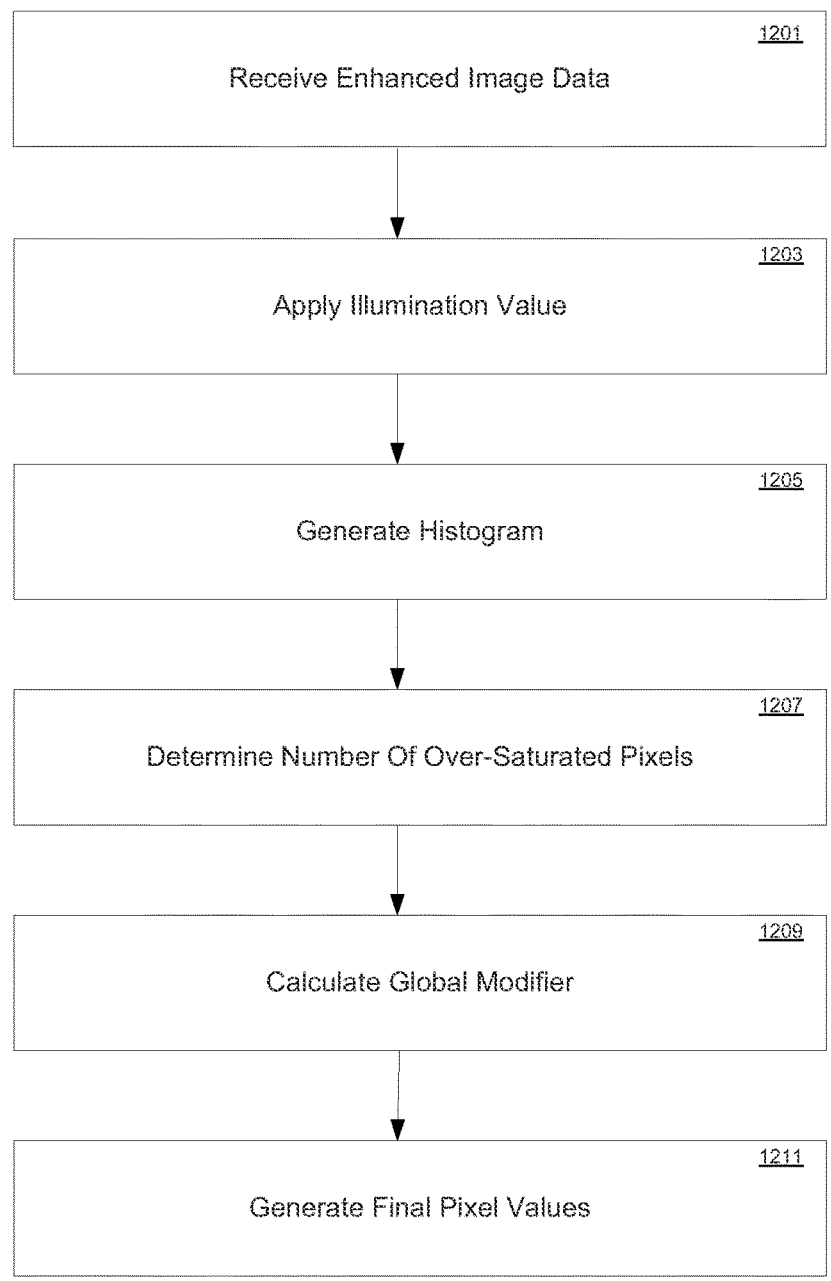
FIG. 12 depicts a flowchart of a process for regional histogramming for global approximation, in accordance with embodiments of the present invention.

FIG. 12 is a flowchart of a process 1200 for regional histogramming for global approximation, in accordance with embodiments of the present invention. Steps 1201-1211 describe the steps comprising the process depicted in the flowchart 1200 of FIG. 12.

At step 1201, image data for a first image is received in a display device. The display device may be implemented as, for example, a flat panel television, a flat panel monitor, or any other flat panel display device with one or more backlights. According to an embodiment, the display panel of the display device is arranged as a plurality of discrete pixels uniformly spaced throughout a two dimensional space. In an embodiment, each backlight corresponds to a region of the display device, with each region comprising a subset of the pixels. In further embodiments, each backlight provides a primary illumination to the corresponding region.

Likewise with processes 1000 and 1100 each described above, the image data may be received from an input source, such as a cable box; over the air transmissions; read from an optical storage medium or computer memory device; or streamed over a network, such as the Internet. Images displayed in a display device may likewise be received as input as a two-dimensional array of pixel values corresponding to the color to be displayed at each pixel in the display device. In an embodiment, the image data received may comprise a two-dimension array of color values in a Red Green Blue (RGB) color space. According to such embodiments, the color values are first converted into a luminance-chrominance (YUV) color space, with each pixel value being represented as a luminance vector. In an embodiment, the input received comprises a plurality of pre-enhanced pixel values, that is, pixel values which have already been modified with an artificial gain value. In further embodiments, the pre-enhanced pixel values may consist of pixel values enhanced with a regional gain value.

At step 1203, an illumination value is applied to each of the plurality of pre-enhanced pixel values. The illumination value may be determined by, for example, referencing a map of illumination values, such as the map of illumination values generated at step 1005 of FIG. 10 described above. At step 1205, a histogram is generated for each region that includes the total brightness of each pixel values. That is, pixel values that were previously enhanced by a regional enhancement process with the applied illumination values. A pre-determined quality threshold is compared to the data in the histogram to determine the number of over-saturated pixels at step 1207. Since color values are limited within the range of 0-255 in an RGB color space, the pixel value is effectively clamped to 255. Pixels may be considered over-saturated when the converted RGB color value of a pixel is at or near 255.

When the number or portion of over-saturated pixels exceeds a threshold (e.g., a quality threshold percentage), a global modifier value is calculated at step 1209. According to some embodiments, the global modifier value may be implemented as a percentage reduction, and applied to the pixel values at step 1211 to reduce the number of over-saturated pixels. In still further embodiments, regional modifiers may be calculated separately for each region, and applied to modify the brightness values of the pixels in each respective region. The global modifier value may, in some embodiments, be applied to the gain estimated for each pixel, such that the "enhancement" previously calculated is modified (typically, reduced). In further embodiments, in addition to, or lieu of modifying the gain for each pixel, the backlight of an entire region may be dimmed (decreased in intensity) by a global modifier value while retaining the previously calculated gains for individual pixels. In instances where the number of over-saturated pixels is lower than the quality threshold, the global modifier value may be implemented as a percentage increase, to bring the number of over-saturated pixels to just below the quality threshold. According to some embodiments, the pixel values may be applied to the pixel values corresponding to a second, subsequent image of a sequence of images comprising both the first and second images.

Accordingly, by verifying the global luminance does not exceed a quality threshold, regionally enhanced pixels with illumination from neighboring backlights are prevented from becoming unintentionally oversaturated, thereby further improving the quality of the image.

Exemplary Computing System

Figure 13:
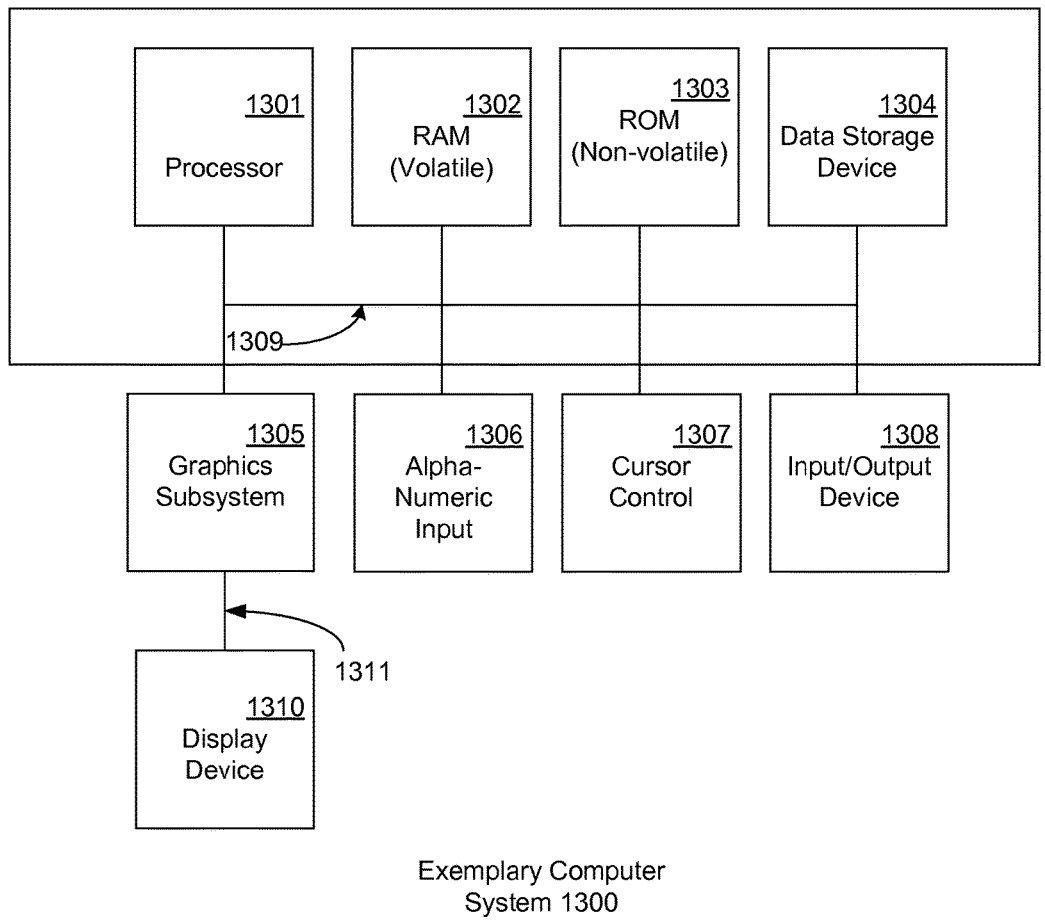
FIG. 13 depicts an exemplary computing system, upon which embodiments of the present invention may be implemented.

As presented in FIG. 13, an exemplary system 1300 upon which embodiments of the present invention may be implemented includes a general purpose computing system environment, such as computing system 1130 described above with respect to FIG. 1. Imaging device 309, depicted in FIG. 3 and described above may, for example, be implemented as a computing system. In its most basic configuration, computing system 1300 typically includes at least one processing unit 1301 and memory, and an address/data bus 1309 (or other interface) for communicating information. Depending on the exact configuration and type of computing system environment, memory may be volatile (such as RAM 1302), non-volatile (such as ROM 1303, flash memory, etc.) or some combination of the two.

Computer system 1300 may also comprise an optional graphics subsystem 1305 for presenting information to the computer user, e.g., by displaying information on an attached display device 1310, connected by a video cable 1311. According to embodiments of the present claimed invention, the graphics subsystem 1305 may be coupled directly to the display device 1310 through the video cable 1311. In alternate embodiments, display device 1310 may be integrated into the computing system (e.g., a laptop or netbook display panel) and will not require a video cable 1311. In one embodiment, the processing and image enhancement of the image data received may be performed, in whole or in part, by graphics subsystem 1305 in conjunction with the processor 1301 and memory 1302, with any resulting output displayed in attached display device 1310.

Additionally, computing system 1300 may also have additional features/functionality. For example, computing system 1300 may also include additional storage (removable and/or non-removable) including, but not limited to, magnetic or optical disks or tape. Such additional storage is illustrated in FIG. 13 by data storage device 1307. Computer storage media includes volatile and nonvolatile, removable and non-removable media implemented in any method or technology for storage of information such as computer readable instructions, data structures, program modules or other data. RAM 1302, ROM 1303, and data storage device 1307 are all examples of computer storage media.

Computer system 1300 also comprises an optional alphanumeric input device 1306, an optional cursor control or directing device 1307, and one or more signal communication interfaces (input/output devices, e.g., a network interface card) 1309. Optional alphanumeric input device 1306 can communicate information and command selections to central processor 1301. Optional cursor control or directing device 1307 is coupled to bus 1309 for communicating user input information and command selections to central processor 1301. Signal communication interface (input/output device) 1309, also coupled to bus 1309, can be a serial port. Communication interface 1309 may also include wireless communication mechanisms. Using communication interface 1309, computer system 1300 can be communicatively coupled to other computer systems over a communication network such as the Internet or an intranet (e.g., a local area network), or can receive data (e.g., a digital television signal).

In the foregoing specification, embodiments have been described with reference to numerous specific details that may vary from implementation to implementation. Thus, the sole and exclusive indicator of what is the invention, and is intended by the applicant to be the invention, is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method for power saving in a display device via pixel enhancement, the method comprising:
receiving, for an image display device with a plurality of operating backlight sources, pixel data for a plurality of pixels distributed over a plurality of regions comprising a first image, wherein the pixel data comprises a color value and a luminance value of each pixel of the plurality of pixels and wherein each region of the plurality of regions corresponds to an operating backlight of the plurality of operating backlight sources;

sorting the pixel data for the plurality of pixels based on the luminance values, wherein the luminance values are used to determine a number of oversaturated pixels in each region of the plurality of regions;

comparing the number of oversaturated pixels in each region of the plurality of regions with a respective threshold number of oversaturated pixels in the region;

when the number of oversaturated pixels in a particular region of the plurality of regions does not exceed the threshold number corresponding to the particular region, calculating a gain value corresponding to an increase in intensity to apply to the color values of a set of pixels from the plurality of pixels corresponding to the particular region, wherein the calculated gain value does not cause the number of oversaturated pixels in the set of pixels after applying the calculated gain value to exceed the threshold number corresponding to the particular region;

applying the calculated gain value to the pixel data of the pixels corresponding to the particular region; and decreasing a luminance of the operating backlight corresponding to the particular region based on the calculated gain value for the pixels corresponding to the particular region, wherein the threshold number corresponding to the particular region is based on the proximity of the particular region to a center of the first image.

2. The method according to claim 1, wherein the color value comprises a value in a Red Green Blue (RGB) color space.

3. The method according to claim 1, wherein a luminance value of each pixel of the plurality of pixels comprises a corresponding luminance vector, and wherein the sorting the plurality of pixels comprises converting each pixel of the plurality of pixels from the RGB color space into a corresponding luminance vector.

4. The method according to claim 3, wherein the sorting the plurality of pixels further comprises generating a histogram of the pixel data corresponding to the plurality of pixels.

5. The method according to claim 4, wherein the threshold number corresponding to the particular region is determined by computing a median of the pixel data for the particular region.

6. The method according to claim 4, wherein the sorting the plurality of pixels further comprises distributing the pixel data of the plurality of pixels in a plurality of bins according to the histogram.

7. The method according to claim 6, wherein the threshold number corresponding to the particular region comprises a maximum number of pixels in a highest bin of the plurality of bins in the particular region.

8. The method according to claim 1, wherein calculating a gain value comprises clamping the gain value.

9. The method according to claim 8, wherein the clamping the gain value comprises applying a soft clip to the clamping.

10. The method according to claim 1, wherein the luminance value corresponding to a pixel of the plurality of pixels corresponds to at least one illumination source selected from the group of illumination sources consisting of:
a regional backlight corresponding to the pixel;
a neighboring backlight corresponding to the pixel; and
an edge-reflected illumination.

11. The method according to claim 10, wherein the luminance value corresponding to the contribution from edge-reflected illumination is calculated by modeling the edge-reflected illumination as a virtual illumination source.

12. The method according to claim 1, wherein the image display device comprises a plurality of regions corresponding to a plurality of regional backlights, and wherein the sorting the pixel data comprises separately generating a histogram for each of the plurality of regions.

13. The method according to claim 12, wherein the calculating a gain value comprises calculating a separate regional gain value based on the separately generated histogram for each of the plurality of regions, and wherein the applying the calculated gain value comprises applying the regional gain value to each pixel in a corresponding region.

14. The method according to claim 13, wherein each region of the plurality of regions corresponds to a backlight source of the plurality of operating backlight sources, further wherein the decreasing a luminance of a plurality of operating backlight sources comprises decreasing a luminance of an operating backlight source based on the regional gain value calculated for the region corresponding to the operating backlight source.

15. A system for providing power saving in an image display device via pixel enhancement, the system comprising:
a display device comprising a plurality of pixels distributed over a plurality of regions, the display device configured to display a plurality of images;
a plurality of backlight devices, each backlight device of the plurality of backlight devices being configured to generated illumination for a set of pixels from the plurality of pixels corresponding to a region of the plurality of regions; and
a processor coupled to the display device and the plurality of backlight devices, the processor being configured to sort pixel data of a first image of the plurality of images based on luminance values of a plurality of pixel values in the pixel data corresponding to the plurality of pixels, wherein the luminance values are used to determine a number of oversaturated pixels in each region of the plurality of regions, the processor further configured to compare the number of oversaturated pixels in each region of the plurality of regions with a respective threshold number of oversaturated pixels in the region;
wherein, when the number of oversaturated pixels in a particular region of the plurality of regions does not exceed the threshold number corresponding to the particular region, the processor is further configured to calculate an enhancement gain value for the particular region corresponding to an increase in intensity for the set of pixels corresponding to the particular region, and to decrease the illumination generated by a backlight device corresponding to the particular region based on the calculated enhancement gain value,
wherein the display device is further configured to apply the calculated enhancement gain value to the set of pixels and display a resultant output,
wherein the calculated enhancement gain value does not cause the number of oversaturated pixels in the set of pixels to exceed the threshold number corresponding to the particular region after the calculated enhancement gain value is applied to the pixel data,
further wherein the threshold number corresponding to the particular region is based on the proximity of the particular region to a center of the first image.

16. The system according to claim 15, wherein the pixel data is received by the processor from an input source.

17. The system according to claim 16, wherein the pixel data is received in a Red Green Blue (RGB) color space.

18. The system according to claim 17, wherein the processor is further configured to convert pixel data corresponding to each of the plurality of pixels from the RGB color space into a luminance vector.

19. The system according to claim 15, wherein the processor is configured to sort the pixel data by generating a histogram of the plurality of luminance values and distributing the luminance values of the plurality of pixels in a plurality of bins according to the histogram.

20. The system according to claim 19, wherein the threshold number corresponding to the particular region comprises a maximum number of pixel values in a highest bin of the plurality of bins in that region.

21. The system according to claim 15, wherein the processor is further configured to clamp the calculated enhancement gain value.

22. The system according to claim 15, wherein the processor is further configured to apply a soft clip to the calculated enhancement gain value.

23. The system according to claim 15, wherein an illumination generated by the backlight device corresponds to at least one illumination source selected from the group of illumination sources consisting of:
   a first regional backlight of the plurality of regional backlight sources;
   a neighboring backlight of the plurality of regional backlight sources that is not the first regional backlight; and
   an edge-reflected illumination from the plurality of regional backlight sources.

24. The system according to claim 23, wherein the processor is further configured to calculate an enhancement gain value for the plurality of pixels by modeling the edge-reflected illumination as a virtual illumination source and calculating a luminance contribution of the edge-reflected illumination.

25. A non-transitory computer readable medium containing programmed instructions, which, when executed by a processor in an image device is operable to perform power saving in an image display device via pixel enhancement, the programmed instructions comprising:

instructions to receive, for an image display device with an operating backlight source comprising a plurality of operating backlights, pixel data for a plurality of pixels distributed over a plurality of regions comprising a first image, wherein the pixel data comprises a color value and a luminance value for each pixel of the plurality of pixels and wherein each region of the plurality of regions corresponds to an operating backlight of the plurality of operating backlights;

instructions to sort the pixel data for the plurality of pixels based on the luminance values in the pixel data, wherein the luminance values are used to determine a number of oversaturated pixels in each region of the plurality of region;

instructions to compare the number of oversaturated pixels in each region of the plurality of regions with a respective threshold number of oversaturated pixels in the region;

instructions to calculate, when the number of oversaturated pixels in a particular region of the plurality of regions does not exceed the threshold number corresponding to the particular region, a gain value corresponding to an increase in intensity to apply to the color values of a set of pixels from the plurality of pixels corresponding to the particular region, wherein the calculated gain value does not cause the number of oversaturated pixels in the set of pixels after the calculated gain value is applied to the pixel data to exceed the threshold number corresponding to the particular region;

instructions to apply the calculated gain value to the pixel data of the pixels corresponding to the particular region; and instructions to decrease a luminance of the operating backlight source corresponding to the particular region based on the calculated gain value for the pixels corresponding to the particular region, wherein the threshold number corresponding to the particular region is based on the proximity of the particular region to a center of the first image.

* * * * *